United States Patent [19]

Davis et al.

[11] 4,268,818
[45] May 19, 1981

[54] REAL-TIME PARAMETER SENSOR-TRANSMITTER

[75] Inventors: Murray W. Davis, 20501 Woodmont, Harper Woods, Mich. 48225; Matthew J. Diedzic, 14500 Prospect, Apt. 131, Dearborn, Mich. 48126; Robert F. Knapp, Livonia; Bruce F. Whitney, South Lyon, both of Mich.

[73] Assignees: Murray W. Davis, Harper Woods; Matthew J. Diedzic, Dearborn, both of Mich.

[21] Appl. No.: 888,143

[22] Filed: Mar. 20, 1978

[51] Int. Cl.³ .......................... G01D 5/12; H04B 3/54
[52] U.S. Cl. .................. 340/870.38; 174/146; 340/310 R; 455/612
[58] Field of Search ........... 340/177 R, 310 R, 207 R, 340/207 P; 73/362 R, 342; 174/146; 324/127, 126; 455/612

[56] References Cited

U.S. PATENT DOCUMENTS

| Re. 27,596 | 3/1973 | Hurd | 340/177 R |
|---|---|---|---|
| 2,937,226 | 5/1960 | Kaminski et al. | 174/146 |
| 3,428,896 | 2/1969 | Schweitzer | 340/207 R |
| 3,434,052 | 3/1969 | Fechant | 324/127 |
| 3,633,191 | 1/1972 | Engelhardt et al. | 340/177 R |
| 4,158,810 | 6/1979 | Leskovar | 324/127 |

OTHER PUBLICATIONS

IEEE Transactions, Davis, vol. Pas 96, No. 3, May/-Jun. 1977, pp. 803-825.

Primary Examiner—James J. Groody
Attorney, Agent, or Firm—Cullen, Sloman, Cantor, Grauer, Scott & Rutherford

[57] ABSTRACT

Apparatus for directly monitoring the conductor temperature or other parameters of an energized electric power line conductor, or of the medium adjacent the conductor, on a real time basis, and transmitting a signal indicative of that parameter to a remote location such as to facilitate data processing by computer. The apparatus is powered by the electric or electromagnetic field of the electric power line conductor.

Various embodiments are described for sensing the temperature or other parameter being monitored. Furthermore two techniques are described for transmitting the signal to a remote location. The first such technique is the use of air as the transmission medium and the second technique uses the power line conductor itself as the transmission medium.

37 Claims, 13 Drawing Figures

REAL-TIME PARAMETER SENSOR-TRANSMITTER

BACKGROUND OF THE INVENTION

The present invention is directed to an apparatus for measuring parameters such as the temperature of an energized electric power line. As set forth hereinafter, many parameters such as vibration, strain, temperature, etc., may be measured and signals indicative of such parameters transmitted to a remote location on a real-time basis. However, the present invention was originally conceived and reduced to practice in the environment of measuring the temperature of an electric power line as a vehicle for increasing the thermal capacity of an electric power system. Hence the invention will be described in that environment notwithstanding the many other applications of the present inventive concept. Thus the following explanation of the invention should be understood as merely illustrative and not as a limitation.

The total capability or capacity of an electric power system may be limited by any one or more of the following factors: (a) surge impedance loading or stability constraints; (b) voltage profiles; (c) energy losses; and (d) thermal rating. Most electric power systems consist of relatively short lines and therefore the load capability or capacity is normally limited by the thermal rating. The thermal rating is, of course, the maximum current that the line is capable of carrying and is normally based upon a maximum allowable or safe conductor temperature with an assumption of very pessimistic climatological conditions.

The most predominant parameter or factor utilized in establishing the thermal rating of an overhead electrical power line is the conductor temperature. If the actual conductor temperature is known on a real-time basis, all factors which might limit the thermal rating can be determined, such as the conductor sag, including elevated temperature creep, line hardware and splices and conductor loss of tensile strength. For this reason it is important that the actual conductor temperature on a real-time basis (i.e., as a function of time) be known.

Since load capability is normally limited by thermal rating, and since thermal rating in turn has heretofore been based on assumed pessimistic climatological conditions, it is apparent that thermal rating or load capability may be substantially increased when those pessimistic assumptions are eliminated. Thus to eliminate such assumptions and thereby substantially increase the thermal rating of the conductor, we propose to directly monitor actual conductor temperature on a real-time basis.

The surface temperature of an overhead line is dependent on four heat quantities: (a) thermal convection; (b) thermal radiation; (c) solar radiation; and (d) the internal heat generated within the conductor or $I^2R$ losses. The first three heat quantities are a function of the physical and mechanical properties of the electrical conductor; weather conditions such as the mean wind velocity, wind direction and calmness or gustiness, ambient temperature and direct and indirect solar radiation, and the physical properties of air. The fourth heat quantity is a function of line current and conductor resistance. Conductor resistance, of course, also varies as a function of conductor temperature. Thus our invention avoids the need to measure and/or assume these heat quantities and the factors which affect them by directly measuring conductor temperature.

DESCRIPTION OF THE PRIOR ART

Prior to the present invention, the electrical utility industry has always calculated the conductor temperature or the current of overhead electrical power lines utilizing assumed climatological conditions. The most predominant weather conditions have normally included wind speeds and ambient temperatures, and these have been selected so that the probability of occurrence of the wind speed being less than a prescribed value when the ambient temperature exceeds a predetermined value occurs for only a very small percentage of time throughout the year. Such a procedure has resulted in extremely conservative thermal ratings, i.e., low load capability ratings, and hence a very reliable electric power system. However, since the probability of low wind speeds at high ambient temperatures during maximum load levels is very low, the thermal ratings can be increased dramatically for a large percentage of time during a day or a year if the actual conductor temperatures of the electrical power lines are known. A system which contemplates monitoring the conductor temperature of an energized overhead electrical power line to determine the allowable current or capability of the overhead line on a real-time basis has been described in an article published by one of the inventors herein, Murray W. Davis, in IEEE Transactions on Power Apparatus and Systems, Volume PAS 96 number 3, May/June 1977, page 803-825. Such prior publication describes the overall aspects of such a system but does not describe any particular apparatus for sensing or measuring the conductor temperature nor for transmitting a signal indicative of the temperature to a data processing location.

The conductor temperature of an energized overhead electric power line has never been measured before on a continuous real-time basis because any measuring device mounted on the overhead power line must be capable of withstanding severe design constraints such as: (a) high short circuit current; (b) lightning strokes; (c) high electric and magnetic fields; (d) operability under hostile environmental conditions including severe weather conditions and conductor vibration; (e) high reliability and little or no maintenance; (f) absence of corona arcing or discharge; (g) self-powered when the line is energized, i.e., the absence of batteries or other auxiliary power; and (h) the measured temperatures must be made readily available remotely to facilitate computer data processing.

Thus the present invention achieves all the aforementioned objectives by providing a sensor for sensing the temperature of an electrically energized power line and transmitting a signal indicative of such temperature, on a real-time basis to a remote location. The present apparatus is preferably powered by the power line itself.

Such a Real-Time Thermal Rating System as described herein increases the thermal capability or capacity of a system between 20 to 70 percent on a probability basis and up to 300 percent during optimum weather conditions.

BRIEF DESCRIPTION OF THE DRAWINGS

The foregoing objects of the present invention, together with other objects and advantages which may be attained by its use, will become more apparent upon reading the following detailed description of the invention taken in conjunction with the drawings.

In the drawings, wherein like reference numerals identify corresponding components.

DETAILED DESCRIPTION OF THE INVENTION

With reference to the drawings, the apparatus 10 of the present invention is illustrated as being fastened by a clamp 12 to an electrical conductor or transmission line 14. The clamp 12 is a commercially available corona-free clamp having upper and lower portions 16, 18, respectively, which clamp parts are secured together by three U-bolts 20. Each bolt 20 is threaded at the end of each of its legs to receive a nut thereon for securing the two clamp parts together as is conventional.

The apparatus 10 of the present invention includes four major constituent portions; first the means for obtaining power from the transmission line, second the electronics, third the means for sensing or detecting the temperature or other parameter of or adjacent the transmission line, and fourth a means for transmitting a signal indicative of the temperature or other parameter to a remote location. Each of these four aspects of the present invention will now be explained.

Means are provided to obtain power from the energized transmission line for powering the sensor-transmitter system of the present invention. In a preferred embodiment, the magnetic field of the transmission line being monitored is utilized to provide this power. Therefore, there is no need to provide and replace batteries nor is there any need to provide solar storage cells to store power during daylight hours for operation during night time hours. Furthermore, the apparatus will operate during all load levels of interest of the transmission line. For the purpose of determining conductor temperature of an overhead conductor or transmission line, it is known that for one type or class of transmission line the line current will exceed 200 amperes. Thus we have designed the present embodiment for a minimum or threshold current of 200 amperes. Obviously where a lower threshold current is anticipated, suitable changes should be made as described hereinafter.

In an electric power system of the present type wherein alternating current is being transmitted, it is known that an alternating or sinusoidal magnetic field is generated. The present invention utilizes this alternating magnetic field to induce an alternating current to power the electronics. To achieve this objective, a magnetically permeable loop is constructed to intersect the alternating magnetic field as hereinafter described. Specifically, a hollow loop 24 is formed from a tube of a conducting material, such as aluminum or steel, or a non-conducting material such as plastic, fiberglass, etc. By way of illustration, but not as a limitation, the loop has a length of about 30 inches and a height of about 16 inches. The loop or tube is split to form a slot 26 along its outer periphery to provide access to the interior of the loop. A number of turns of wire are wound around the interior of the loop or tube 24 to function as a transformer to receive the induced alternating electric current. Based upon the threshold or minimum current of approximately 200 amperes in the transmission line, we have determined that for the illustrative loop size, a transformer comprising approximately 130 turns of number 20 AWG enamel insulated wire should be utilized and these 130 turns of wire, identified as 28, are introduced through the slot 26 into the interior of the aluminum tube 24.

The aluminum tube 24 serves as a mandrel for the wire turns which form the induction loop for the power supply and further serves as a support for the electronics and power supply housing. Thus tube 24 is also a housing for the induction loop of wires. Since the power is to be induced in the wires 28 within tube 24, it is important, in selecting the material for tube 24, that the tube be an electric shield. If, for example, the tube 24 is a nonconducting material it may be coated with a metallic substance. In fact the wires themselves could be formed as a loop without the tube 24 or even on the outside of a mandrel, or the wires 28 could form a tubular hollow shell. The diameter of the tube, if provided, or of the loop of wires, should be large enough so that the critical gradient of air is not exceeded at the voltage level of the line.

The tube or loop 24 is not a complete or closed loop, but has first and second spaced apart ends 29, 30, respectively, which are attached to the electronic and power supply housing as will be more fully described.

In order to induce the electric current in the wires 28, the wires must intersect the alternating magnetic field of the transmission line 14. To achieve this, the top part 16 of the clamp 12 is illustrated as being adjacent to the power line or transmission line 14 and the bottom part 18 of the clamp 12 is illustrated as being adjacent to the aluminum tube 24. Thus when the bolts 20 are inserted through the clamp halves and the nuts secured thereto, the aluminum tube 24 is securely fastened to the transmission line. In addition, it is preferred that the clamp bottom 18 be welded as at 31 to the aluminum tube to provide a more secure fastening means. As illustrated, one of the longer sides of the tube 24 is welded to the clamp.

If it should be determined, in a particular environment, that the current will be less than 200 amperes, the number of turns of wire 28 must be proportionally increased to supply the necessary threshold voltage to drive the electronics. In that regard we have used a transmitter with an operating range of 2.3 to 2.7 volts, d.c.

As explained heretofore, the magnetic field of the monitored transmission line is utilized to provide power for the transmitter and therefore there is no need to replace batteries and the transmitter will operate during all load levels of interest. In other applications, such as where the monitored conductor is operating at very high voltages and relatively low currents, a capacitive type power supply may be desirable. Such a capacitive type power supply would use the electric field of the monitored conductor and the difference in voltage between two capacitive corona-free surfaces of sufficient size would provide the power necessary for operating the transmitter.

It should be remembered that the inductive loop of the present invention could be redesigned to operate the transmitter under low load levels, however the larger number of turns could become a limiting factor during high short circuit conditions. Thus instead of a single loop of 130 turns of wire 28, the induction loop could be connected as multiple sub-loops connected in series with appropriate voltage limiting devices connected to ground thereby providing a Pi type of network of induction loops in series and one or more voltage limiting devices in parallel with the ground. Another alternative would be to connect the wires as a number of loops connected to a switching network which under normal conditions connects the loops in series and under fault or surge conditions isolates the loops into a parallel arrangement. Many other alternatives for providing an induced voltage to operate the transmitter are, of course, available.

Having thus described the means for obtaining power from the energized transmission line, we now turn to the apparatus for sensing the desired parameter—in this instance conductor temperature.

With reference to FIGS. 1 through 4, a sensing means 33 such as a thermocouple 34 is provided including a thermocouple junction or probe 36 and a pair of thermocouple wires 38, 40 connected to the probe. The complete thermocouple 34, including the probe 36 and wires 38, 40, is mounted inside a small diameter stainless steel tube or shield 42 which both mechanically and electrically shields the thermocouple. The interior of the end of the tube 42 is filled with an electrically insulating, thermally conductive material 44 such as Wakefield Engineering Delta Bond 152 to encapsulate and seal the thermocouple within the tube. This is illustrated in greater detail in FIG. 3.

If it is desired to sense a different parameter, such as the temperature of ambient air adjacent the conductor, then of course the encapsulating material 44 should not thermally couple the probe to the conductor. Instead, the probe should be thermally coupled to the atmosphere and thermally insulated from the conductor. Other types of temperature sensing means 33 may, of course, be employed such as fiber optics, infrared cameras, etc.

In order to sense or detect temperature of the conductor, the sensor means 33 is placed in contact with the conductor 14. This is illustrated in enlarged fashion in FIG. 3. The sensor probe itself should be located at a sufficiently remote location from the corona-free clamp 12 to prevent errors in measurement of temperature due to any axia temperature gradient created by the clamp and by the induction loop housing 24. We have determined that for an overhead transmission line the probe 36 should be positioned at least 60 inches away from the clamp 12.

Figure 1:
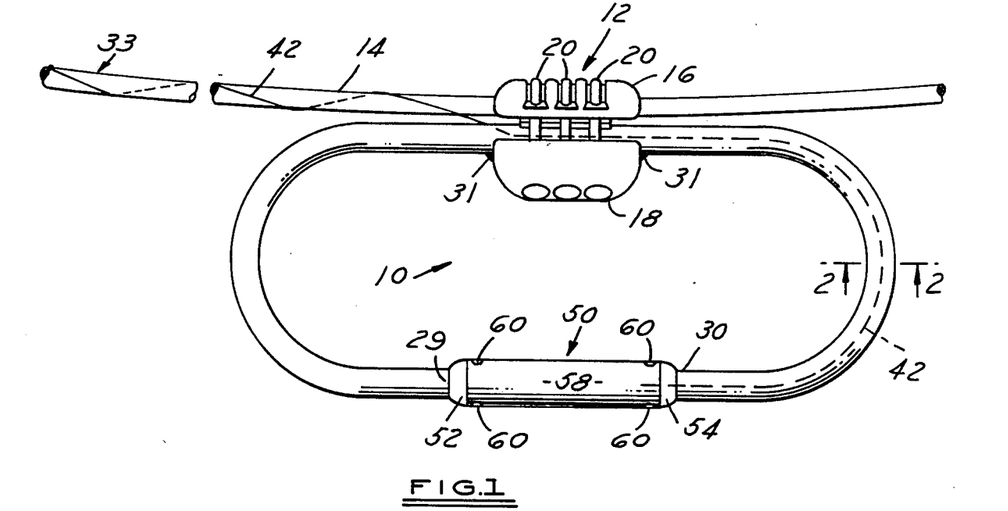
FIG. 1 is a front elevation view of the present invention illustrating generally the sensor, the power supply induction loop housing, and the electronics and transmitter housing, all of which are attached to a transmission or power line or conductor.
Figure 2:
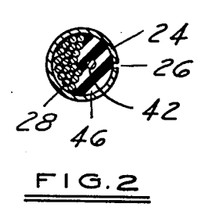
FIG. 2 is a sectional view of the power supply induction loop housing as seen in the plane of arrows 2—2 of FIG. 1.
Figure 3:
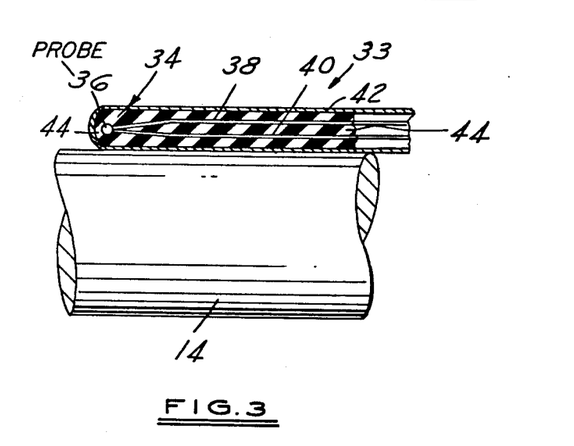
FIG. 3 is an enlarged view of the sensor positioned on the conductor.
Figure 4:
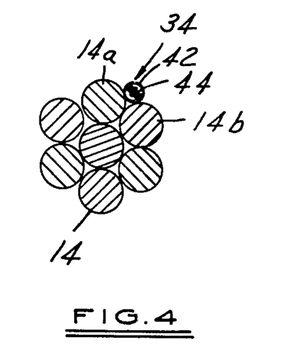
FIG. 4 is an enlarged diagrammatic illustrated of the sensor positioned adjacent two strands of a stranded power line conductor.

While FIGS. 3 and 4 illustrate the position of the sensor means 33 relative to the transmission line 14, in actual practice the transmission line is a series of stranded conductors. Thus the sensor means 33 is placed in the recess between two adjacent strands 14a, 14b, and mechanically attached or bonded to the strands of the stranded conductor. In the stranding of a conductor the recess between any two strands describes a helical path relative to the elongated axis of the conductor. Hence the tube 42 containing the wires 38, 40, and the probe, is actually helically wound relative to the elongated axis of the stranded transmission line.

This technique, of passing the thermocouple probe and wires through a shield 42 precludes corona problems, provides mechanical support for the thermocouple wires, and reduces thermal convection along the length of the conductor where the tube is attached. Thus the tube 42 passes through the clamp 12 and into the induction loop housing or aluminum tube 24, via the slot 26, and thereafter internally of the tube 24 to the electronics as will be hereafter described.

The combination of the wire turns 28 and the tube or shield 42 are maintained in the induction loop housing 24 and protected from the environment by encapsulating them in a silicone potting compound 46 such as Dow Chemical Sylgard 184 within the induction loop housing.

Having thus described the sensor or sensing means and the power induction, we turn next to the electronics and its housing.

Figures 5, 8:
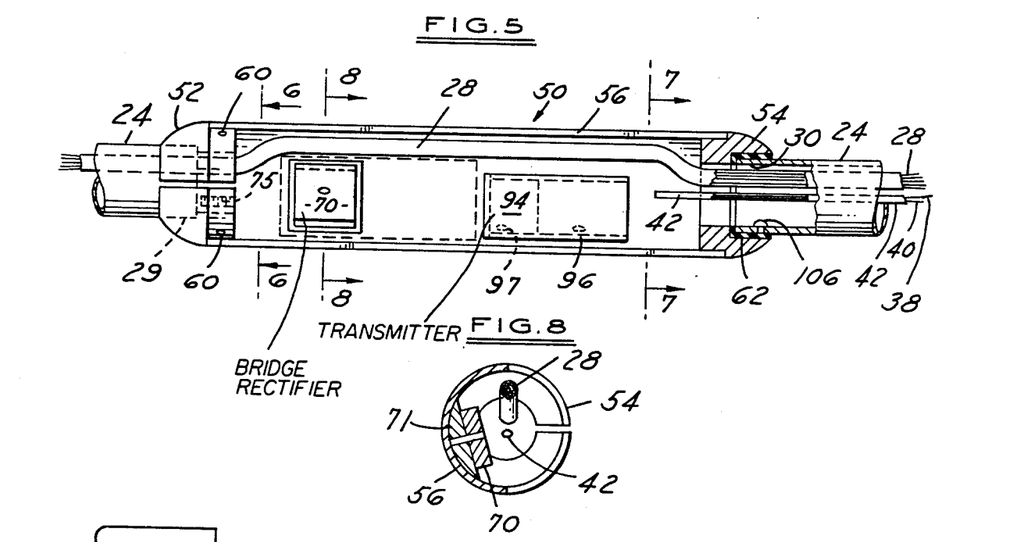
FIG. 5 is an enlarged, partially broken away front elevation the electronics and transmitter housing.
FIG. 8 is a sectional view as seen in the plane of arrows 8—8 of FIG. 5.

Approximately 180 degrees around the induction loop housing 24 from the clamp 12, and specifically intermediate the ends 29, 30 of the housing 24, the electronics and power supply housing 50 is provided. This housing comprises two bell-shaped metal, corona-free members 52, 54, called end bells and secured to the loop ends 29, 30, and two elongated semi-circular cover plates 56, 58 which span the distance between the spaced apart end bells. The cover plates are secured to the end bells by fasteners such as screws 60. As illustrated in FIG. 5, an electrically insulating bushing 62 is provided intermediate the end bell 54 and the tube end 30 to prevent any electrical contact between the power supply housing 50 and the induction loop housing 24.

Since the electric and magnetic fields decrease in strength with increasing distance from the conductor, the effect of these fields is minimized if the electronics and transmitter are placed in the housing 50 as far away as practical from the conductor 14.

Figure 6:
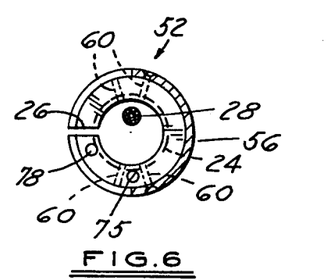
FIG. 6 is a sectional view as seen in the plane of arrows 6—6 of FIG. 5.
Figure 7:
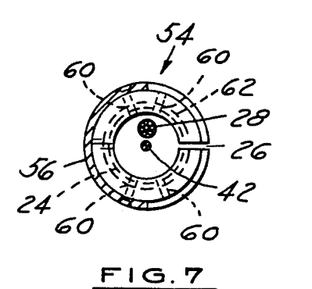
FIG. 7 is a sectional view as seen in the plane of arrows 7—7 of FIG. 5.
Figure 9:
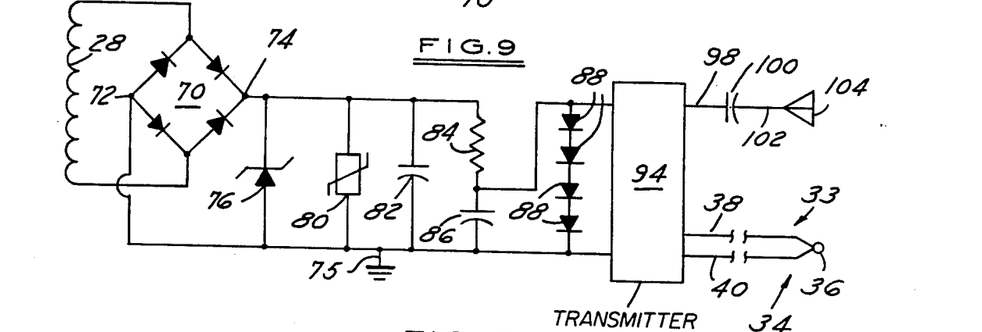
FIG. 9 is a circuit diagram of the electronics of FIG. 5.

The electronics of the present invention will now be described. As seen in FIGS. 5 and 9 the coil of wires 28 acts as a transformer secondary and receives an induced current from the increasing and decreasing or sinusoidally alternating magnetic field in the induction loop housing. This coil is connected to the a.c. side of a 600 volt 35 amp bridge rectifier assembly 70 which provides, as its output between terminals 72 and 74, a full wave rectified d.c. signal. The rectifier is attached to an aluminum mounting saddle base plate 71 which in turn is attached to the rear cover 56. Thus the plate 71 also serves as a heat sink for the rectifier. Across the output terminals 72, 74 of the rectifier 70, in parallel, we provide an 1N3305 Zener diode 76 which clamps the output voltage from the rectifier at approximately 6.8 volts and is capable of dissipating up to a maximum of 50 watts. The Zener diode, as supplied by the manufacturer, has a threaded end and is mounted in a tapped hole 78 in the aluminum end bell 52. Thus the end bell acts as a heat sink for the Zener diode and as the system ground. A screw 75 is used to connect the electronics to the end bell and thus, in FIGS. 6 and 9, the reference numeral 75 represents system ground. The Zener diode is mounted in the tapped hole with silicone grease.

In parallel with the Zener diode 76 across the output terminals 72, 74 of the bridge rectifier is a V22ZA3 metal oxide varistor 80 which provides a safety function in that it operates to suppress transient voltages. The transient capability of this varistor is three joules and is capable of withstanding a transient peak current of 250 amperes. Also in parallel across the output terminals of the bridge rectifier is a 1,000 microfarad 25 volt capacitor 82. Also in parallel with the output terminals of the bridge is a series combination of a 250 ohm resistor 84 and a 100 microfarad 12 volt capacitor 86. Four 1N4001 series connected diodes 88 are connected across the capacitor 86. The resistor is designed to limit the current to the transmitter, the two capacitors provide ripple reduction and the four diodes provide final voltage regulation to the transmitter.

Having thus described the electronics, we now turn to the transmitter and the remainder of the electronics-power supply housing 50.

In one embodiment we use a commercially available transmitter 94, such as that supplied by the Acurex Corporation of California.

The transmitter 94 is placed in a ferrous cylinder 96 which is secured by screws 97 to one cover plate 56 within the housing 50 to provide shielding from the magnetic field of the electrical power line. If the transmitter is manufactured with a magnetic shield, or if the housing 50 and end bells provide a magnetic shield, then the separate ferrous cylinder is not required. The transmitter output, on lead 98 passes through a 100 picofarad coupling capacitor 100 and then via lead 102 to an antenna 104. In the embodiment heretofore described, the aluminum loop housing 24 serves as the antenna, and thus the lead 102 passes interiorly of the insulating bushing 62 and is attached to the housing 24 by a screw 106. Thus bushing 62 prevents the housing 50 and the inductor loop housing 24 from becoming a shorted turn, and it further enables the loop housing 24 to serve as an antenna 104.

As illustrated in FIG. 5, the stainless steel thermocouple shield or tube 42 extends through the interior of the end bell 30 and terminates about one inch inwardly of the end bell 30 within the housing 50. The thermocouple shield is electrically isolated from the end bell 30 and from the housing 50 except at the corona-free clamp 12. The thermocouple probe, as heretofore described, is electrically insulated from the power line 14, by the encapsulation 42, to prevent transmitter malfunction. The thermocouple wires 38, 40, are, of course, connected to the transmitter 94 to provide the input signal thereto.

As part of the assembly of the housing 50, one end bell 52 is pressed onto the end 29 of the loop housing 24 and the other end bell 54 is placed on the insulating bushing 62 and then onto the other end 30 of the housing 24. Both end bells are shaped to be corona-free at the transmission line operating voltage and both the end bells and the insulated bushing are slotted to facilitate subsequent winding the wire turns 28. With the end bells in position, one cover plate 56 is secured to the end bells by screws 60, the wire turns are wound around inside housings 24 and 50. Then the electronics are placed within housing 50, all electrical connections and mechanical connections made as described, and the other cover plate 58 secured by screws 60 to the end bells.

The direct conductor temperature sensor transmitter of the present invention is capable of withstanding the following: at least 13209 amperes symmetrical rms for five cycles short circuit current, an electric field of 50 kilovolts per centimeter, a magnetic field of 50 gauss, and an ambient temperature in the range of −10 degrees Celsius to 100 degrees Celsius. The temperature measurements are accurate to within plus or minus 1.5 percent of full scale (−10 degrees to 200 degrees Celsius) when the electric and magnetic fields do not exceed 24 kilovolt per centimeter and 30 gauss, respectively. Typically, the electric and magnetic fields of a transmission line do not exceed 20 kilovolts per centimeter and 10 gauss, hence accuracy within plus or minus 1.5 percent is anticipated.

Having thus described the basic system and all of its components, various modifications and alternatives will be explained.

Figure 10:
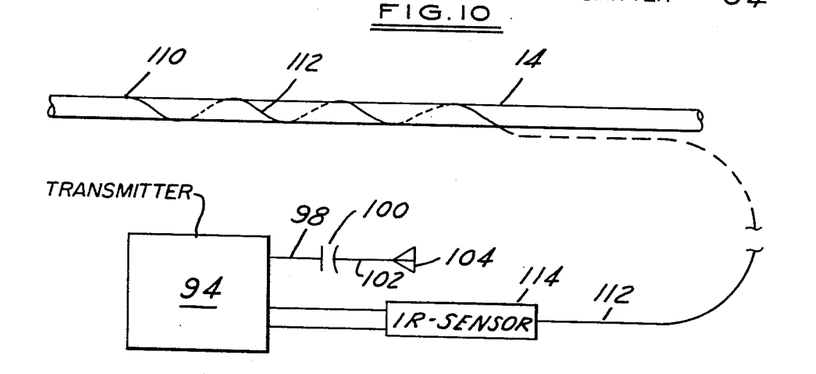
FIG. 10 is an illustration of an optional sensor of the fiber optic type.

With reference first to FIG. 10, it should be understood that an alternative to the thermocouple probe may be provided as the sensor 33. Specifically, the conductor temperature sensing device may be a fiber optic-infrared sensor combination. Thus a fiber optic-infrared sensor combination would replace the thermocouple probe 36, the thermocouple wires 38, 40 and the stainless steel tube 42 which operates as a shield. The option of providing a fiber optic-infrared sensor combination eliminates radio interference problems, heat conduction problems and the precautions needed in the case of the thermocouple probe of providing an electrically insulating and thermal conducting bond between a thermocouple probe and the electric power line conductor 14.

Specifically, and with reference to FIG. 10, the optional sensor 33 is illustrated. It should be remembered, in understanding FIG. 10, that FIG. 10 only is intended to illustrate those portions of the invention which differ from the first nine figures, along with certain components illustrated for ease of understanding such as the conductor or transmission line 14, the transmitter 94 and the transmitter output through the capacitor to the antenna consistent with FIG. 9.

FIG. 10 further illustrates a fiber optic probe 110 which is attached to a fiber optic flexible cable 112. The cable 112 is helically wrapped around the transmission line 14 and enters the induction loop housing 24 as illustrated in the case of the thermocouple of FIG. 1. The fiber optic transmits infrared radiation energy emitted by the power line conductor along the cable to a high response photon detector commonly called an IR Sensor 114. The IR Sensor 114 converts the received infrared energy, which is proportional to the conductor temperature, and provides a suitable signal as the input to the transmitter 94. The IR Sensor 114 is shielded from the electric and magnetic fields as is conventional.

Figure 11:
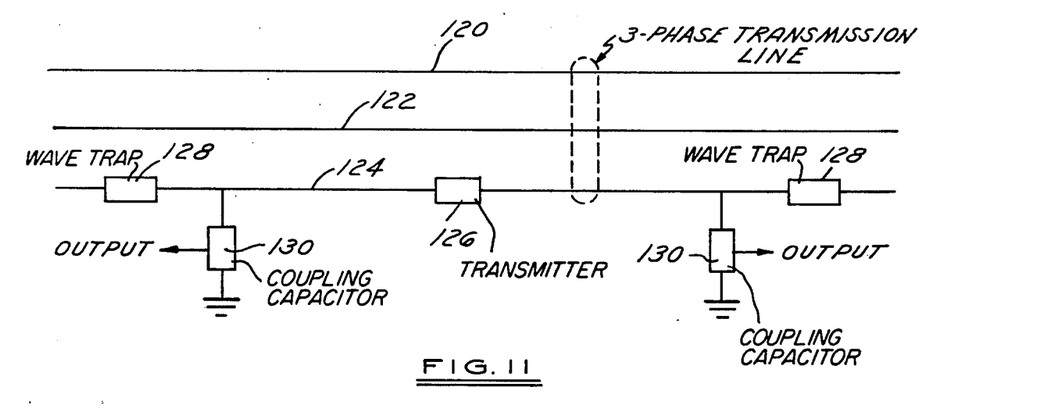
FIG. 11 is a block diagram illustrating the use of the conductor for transmitting signals to a remote location.
Figure 12:
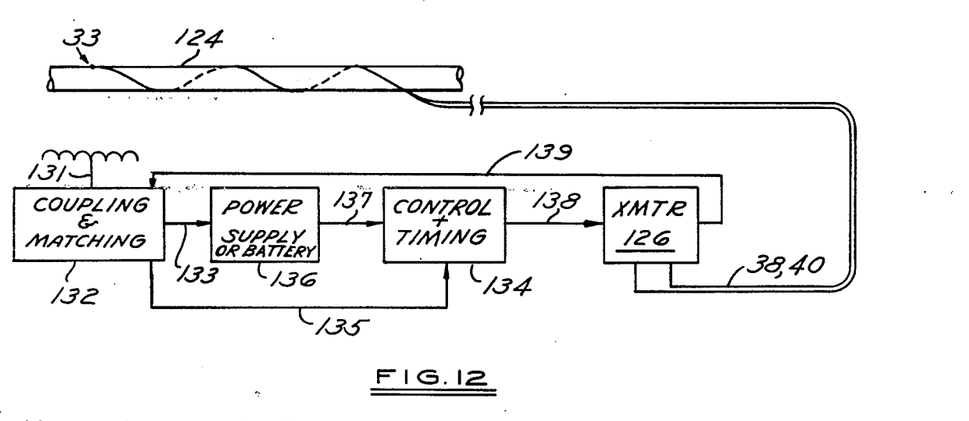
FIG. 12 is a block diagram of the transmitter portion of a system for using the conductor for transmitting signals to a remote location.
Figure 13:
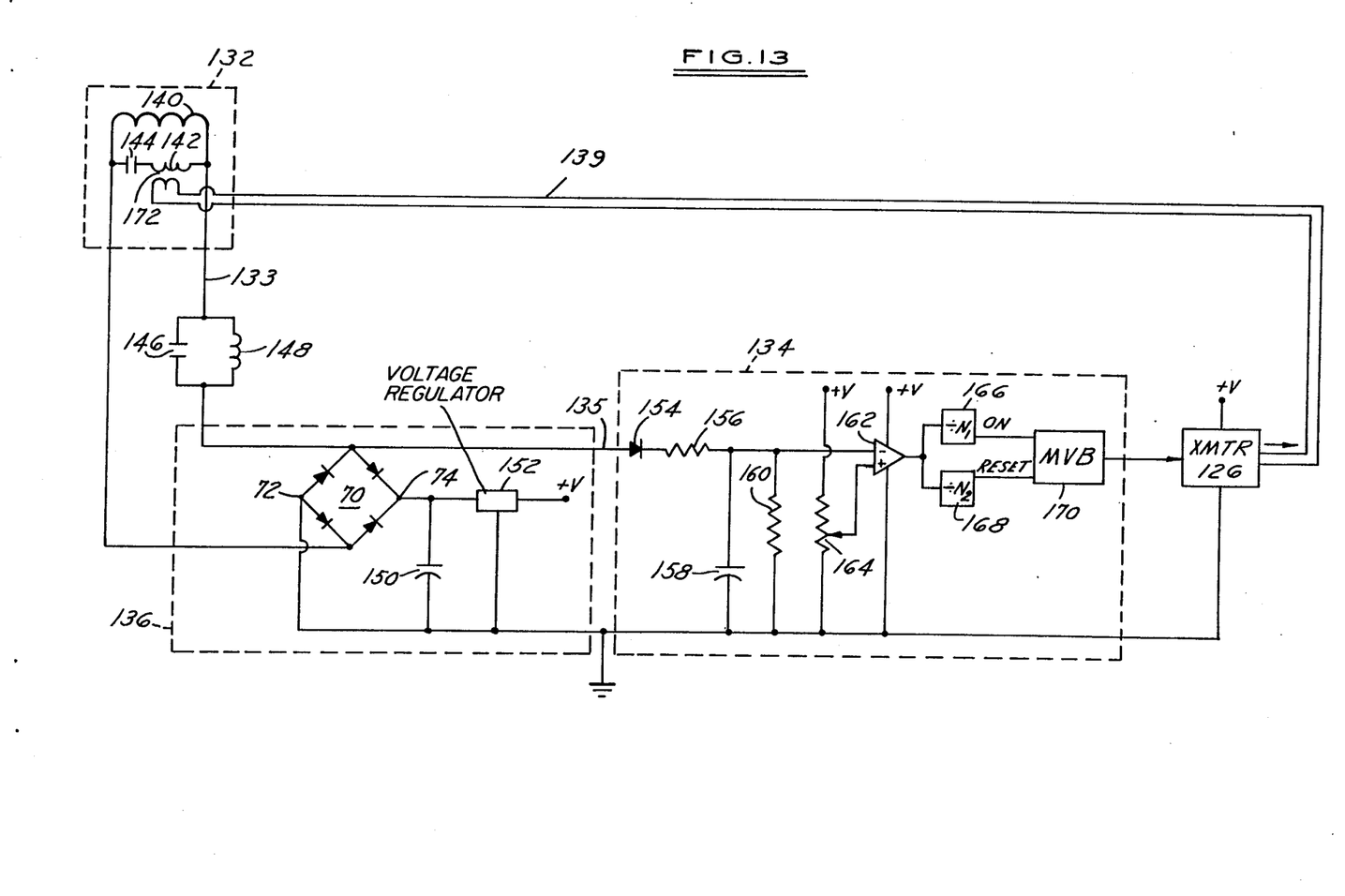
FIG. 13 is a detailed circuit schematic diagram for the block diagram of FIG. 12.

As heretofore described, another option of the present invention is to utilize the conductor itself rather than air as the medium for transmitting the signal indicative of the parameter to a remote location. Such a system is illustrated in FIGS. 11, 12 and 13. In describing these figures, it should be remembered that the present invention is being described in the environment of an overhead conductor or transmission line of the type normally utilized by electric utility companies. As such the conductor is typically a three-phase transmission line 120, 122, 124 as illustrated in FIG. 11. In addition, the public utility companies are granted by the Federal Communications Commission to transmit a carrier frequency in the range of 30 khz to 300 khz. Carrier signals are utilized by the utility industry in this signal range for various relay control functions among other uses. Hence a carrier signal in this frequency range is already available with respect to utility transmission lines.

In lieu of transmitting a signal from the transmitter 94 indicative of the parameter measured, the present invention contemplates that the signal may be transmitted to a remote location through the use of the power line carrier signals as a transmission medium. Such a system is shown generally in FIG. 11 for transmitting or telemetering transmission line conductor temperature to a data acquisition system located at a remote line terminal. Since the signal is being transmitted along the power line, housing 24 is no longer used as an antenna and hence it need not be metallic. Conceptually the present design uses a transmitter 126 on one of the transmission lines 124 of the three-phase transmission line to transmit the signal. Wave traps 128 are provided at each end of the transmission line 124 to prohibit the carrier frequency from being transmitted past the end of the line. The trap is an impedance device which provides essentially zero impedance to a 60 hz signal and an extremely high impedance to the chosen carrier frequency utilized by the utility company within the range of 30 khz to 300 khz.

Existing power transmission lines include coupling capacitor potential devices 130, which function as coupling capacitors. These coupling devices 130 are tuned to resonate at the frequency of the transmitter 126. Thus a large loop is formed consisting of the transmission line, the coupling capacitor devices 130, the earth and the coupling capacitor device 130 connected to the other end of the line. The coupling capacitor devices 130 are designed to allow resonance at more than one frequency to thus enable the system to work without affecting existing carrier current relaying schemes.

Multiple transmitters may thus be attached to a particular line and received by a single receiver. This is accomplished with each transmitter transmitting their signal in a predetermined sequence and spaced apart in time. Synchronization would be achieved by coupling alternating current power from the 60 hz transmission line. The receiver will be similarly synchronized to the transmitters by utilizing the 60 hz power from the line current transformers at a remote station in the utility system.

The important feature, in regard to transmitter output coupling, is that the carrier frequency power will be coupled to the transmission line in the form of induced current because no convenient reference point is available for voltage coupling as is commonly done with conventional power line carrier techniques used for system protection or relay purposes.

With reference to FIG. 12, means are illustrated for receiving the induced power from the transmission line or conductor to provide the power for the electronics and for the transmitter 126. In general, the output from the coil of wires 28, which have been previously described as forming the secondary of the transformer, is connected via lead 131 to a coupling and matching network 132. This coupling and matching network performs three functions. First, the network 132 provides a means of coupling the signal in the range of 30 to 300 khz from the output of the transmitter 126 back to the power or transmission line. Second, it supplies the 60 hz alternating current signal to the power supply electronics. Third, the network 132 provides a timing signal at 60 hz to the control and timing network 134.

The power supply electronics 136 produces a regulated d.c. voltage which is utilized by the control and timing network 134 and by the transmitter 126. The purpose of the control and timing network 134 is to provide an input signal to the transmitter thus allowing the transmitter to turn on and off at certain time intervals as part of the sequencing operation. The transmitter, having received a signal from the control and timing network 134, along with temperature data from the sensor means 33 such as the wires 38, 40 transmits a FSK (Frequency Shift Key) signal back through the coupling and matching network 132 to the transmission line conductor 124.

With reference to FIG. 13, the details of the block diagram of FIG. 12 will now be explained. First, with respect to the coupling and matching network 132, a transformer 140 is provided and a series L-C circuit including inductance 142 and capacitor 144 are in parallel across the transformer 140. The L-C circuit resonates at the carrier frequency chosen for signaling purposes. For optimum coupling, the transformer 140 may consist of a powdered iron core surrounding the transmission line 124 and as such it would replace the number of turns of wire 28 wrapped around the inside of the induction loop 24. However, it is not required that such a powdered iron core transformer be used. A parallel resonate circuit, including capacitor 146 and inductance 148 connected in parallel, are placed in the line 133 between the output of the coupling and matching network 132 and the input to the power supply electronics 136. This parallel resonate circuit is tuned to block the carrier frequency from entering the power supply 136. The transformer 140 also may serve as a source of power for the transmitter or optionally a battery, or solar cells, may be used.

The output from the coupling and matching network, along lines 133, enters the power supply electronics 136 as the input side to the full wave rectifier assembly 70. The output from the full wave rectifier assembly, heretofore described as taken from terminal 72 and 74 of the rectifier assembly 70, is coupled across a filtering capacitor 150 to an integrated circuit voltage regulator 152. The output from the regulator 152 supplies a d.c. voltage to the transmitter and to the control and timing network 134; the control and timing circuit 134 requires a stable voltage supply.

The purpose of the timing and control circuit or network 134 is to allow the receiver, which is positioned at the end of the electric power line, to discriminate between multiple transmitters installed on a particular line. Thus as illustrated in FIG. 13, an individual transmitter 126 is turned on and allowed to transmit a FSK signal for a predetermined time period such as three seconds. For example, by knowing that a signal was received during the first three seconds of a particular time interval, the data would indicate which transmitter sent the signal based on the sequencing and synchronization of the various transmitters. This control and timing is accomplished by sensing the half wave rectified 60 hz a.c. signal as follows.

Specifically, one output from the coupling and matching network 132 along line 135 is fed through a diode 154 and then through a series connected resistor 156 to provide a half wave rectified 60 hz a.c. signal. The output from the resistor, i.e., the half wave rectified 60 hz signal is connected across a filtering and biasing network comprising a capacitor 158 ad a resistor 160 each of which is connected across the output from the resistor 156 and the output terminal 72 of the rectifier assembly 70. This signal serves as the inverting input to a comparator 162 which may be a conventional operational amplifier acting as a comparator. The non-inverting input to the comparator is taken from a biasing resistor 164 which derives its voltage from the regulator 152. The supply voltage for the comparator 162 is also taken from the regulator 152.

The output of the comparator 162 is a square wave whose frequency is 60 hz. This output is fed into two parallel divide by N counters 166, 168 whose outputs are connected to a monostable multivibrator 170. The values fed into these counters would depend upon how many transmitters were on a particular transmission line and when a particular transmitter was to operate. Thus the output from the N one counter 166 turns on the multivibrator 170 while the output from the N two counter 166 resets the multivibrator.

The operation of the monostable multivibrator 170 is as follows. There will not be an output unless the multivibrator is reset before an "on" pulse is received. Therefore the output of the multivibrator, whose output goes to turn on and off the transmitter, is preselected to determine when a particular transmitter will transmit in its respective sequence along with other transmitters in the system. The duration of the monostable multivibrator is preselected to determine the length of time that the transmitter will stay on after it has been triggered.

The voltage from the regulator 152 may also provide the input voltage to the transmitter 126 if batteries or solar cells are not used. The output from the transmitter 126 is connected via leads 139 to the coupling and matching network through the additional inductance 172. This additional inductance 172 serves to induce a signal back though the transformer 140 and along the transmission line at the carrier frequency.

The foregoing is a complete description of a preferred embodiment of the present invention together with various alternatives. Many parameters may be measured such as temperature, vibration, strain, humidity, relative position, leakage and voltage. In fact, the present system may be utilized to monitor physical, mechanical, electrical or temperature parameters or virtually any parameter limited only by the availability of a transducer which senses the parameter and responds with an electrical signal.

The types of equipment or devices which may have such parameters include energized conductors, transformer cores, bushings, circuit breakers and transformers, disconnect hardware, pipe type cable, insulators and buses. Furthermore, the parameter may be an ambient condition such as temperature adjacent the conductor, including ambient temperature, solar radiation and the like.

Finally, by using a transducer which both generates and receives signals, such as radar, sonar, etc., (powered from the coil 28) the present invention attached to an overhead power line may be used to monitor vehicular traffic on roadways and signal traffic flow patterns and traffic congestion to a remote location.

Many changes and modifications may be made without departing from the spirit and scope of the present invention. For example, a rechargeable battery or large capacitor may be added to the power supply across the transmitter to maintain the operation of the transmitter during periods of time when the flux produced by the energized conductor is not sufficient to power the transmitter from the induction coil alone. In addition to the monitoring functions, the power supply may also be used to supply power to warning and/or aircraft avoidance beacons attached to the overhead power lines. The transmitter load need merely be replaced by an aircraft type high intensity strobe light mounted to the exterior of the transmitter and power supply housing. Thus it should be appreciated that the invention should be limited only by the following claims.

What is claimed is:

1. In an apparatus for directly measuring at least one parameter of an electrically energized alternating current carrying conductor and including a transmitter for continuously transmitting a signal proportional to said parameter, the improvement comprising:

means including a plurality of turns of wire wound around a mandrel for receiving only induced energy from said energized conductor for energizing said transmitter, said plurality of turns of wire formed as the secondary winding of an air core transformer; and said mandrel is at the same electrical potential as said conductor.

2. The invention as defined in claim 1 wherein the magnetic field of said conductor induces an electric current in said transmitter energizing means.

3. The invention as defined in claim 1 wherein the parameter being measured is the temperature of said conductor.

4. The invention as defined in claim 3 wherein the temperature is directly measured by a thermocouple.

5. In an apparatus for directly measuring at least one parameter of a conductor carrying an alternating current and including a transmitter for continuously transmitting a signal representative of said parameter, the improvement comprising:

transducer means electrically insulated from said conductor for directly sensing the parameter of said conductor to be measured;

said transducer sensing means being electrically coupled to said transmitter; and means suspended from said conductor and responsive to the alternating current carried by said conductor, and receiving an induced current therefrom, for powering said transmitter.

6. The invention as defined in claim 5 wherein said transducer sensing means is a thermocouple probe.

7. The invention as defined in claim 5 wherein said transducer sensing means is a fiber optic probe.

8. The invention as defined in claim 5 wherein said transmitter powering means also couples the output of said transmitter to said conductor for transmission along said conductor.

9. The invention as defined in claim 5 wherein said transmitter powering means includes:

a plurality of turns of wire formed as the secondary winding of an air core transformer having a current induced therein for powering said transmitter.

10. The invention as defined in claim 9 wherein said powering means further includes:
   a mandrel secured to said conductor; said mandrel having said plurality of turns of wire wound thereupon.

11. The invention as defined in claim 10 wherein said mandrel is also an antenna for said transmitter.

12. The invention as defined in claim 9 wherein said plurality of turns are connected as a single, continuous loop.

13. The invention as defined in claim 9 wherein said plurality of turns of wire are connected as multiple loops.

14. The invention as defined in claim 10 wherein said mandrel is also a support for said apparatus.

15. The invention as defined in claim 10 wherein said mandrel is at the same electrical potential as said conductor.

16. In an apparatus for directly measuring at least one parameter of a conductor carrying an alternating current and including a transmitter for continuously transmitting a signal representative of said parameter, the improvement comprising:
   means for directly sensing a parameter of said conductor;
   said sensing means being electrically coupled to said transmitter;
   an elongated first hollow housing secured to said conductor, and having two spaced apart ends;
   a second housing positioned between said ends of said first housing and supported thereby; said transmitter positioned in said second housing; and
   means positioned in said first and second housings and responsive to the alternating current carried by said conductor and receiving an induced current therefrom for powering said transmitter.

17. The invention as defined in claim 16 wherein said second housing is positioned away from said conductor to minimize the effect of electric and magnetic fields from said alternating current on said transmitter and on said transmitter powering means.

18. The invention as defined in claim 16 wherein said sensing means comprises:
   a thermocouple probe electrically connected to said transmitter;
   said thermocouple probe mounted in a shield and encapsulated therein by a thermally conductive, electrically insulating material.

19. The invention as defined in claim 18, wherein said thermocouple shield is helically wound around said conductor and enters said first housing at a first location, said shield being thereafter positioned internally of said first housing.

20. In an apparatus for directly measuring at least one parameter adjacent to an electrically energized alternating current carrying conductor and including a transmitter for continuously transmitting a signal proportional to said parameter, the improvement comprising:
   means including a plurality of turns of wire wound around a mandrel for receiving only induced energy from said energized conductor for energizing said transmitter;
   said plurality of turns of wire formed as the secondary winding of an air core transformer; and
   said mandrel is at the same electrical potential as said conductor.

21. The invention as defined in claim 20 wherein the magnetic field of said conductor induces an electric current in said transmitter energizing means.

22. The invention as defined in claim 20, wherein the parameter being measured is the ambient temperature adjacent said conductor.

23. The invention as defined in claim 22 wherein the temperature is directly measured by a thermocouple.

24. In an apparatus for directly measuring at least one parameter adjacent a conductor carrying an alternating current and including a transmitter for continuously transmitting a signal representative of said parameter, the improvement comprising:
   means electrically insulated from said conductor for directly sensing the ambient parameter to be measured;
   said sensing means being electrically coupled to said transmitter;
   means suspended from said conductor and responsive to the alternating current carried by said conductor, and receiving an induced current therefrom, for powering said transmitter.

25. The invention as defined in claim 24 wherein said sensing means is a thermocouple probe.

26. The invention as defined in claim 24 wherein said sensing means is a fiber optic probe.

27. The invention as defined in claim 24 wherein said transmitter powering means also couples the output of said transmitter to said conductor for transmission along said conductor.

28. The invention as defined in claim 24 wherein said transmitter powering means includes:
   a plurality of turns of wire formed as the secondary winding of an air core transformer having a current induced therein for powering said transmitter.

29. The invention as defined in claim 28 wherein said powering means further includes:
   a mandrel secured to said conductor: said mandrel having said plurality of turns of wire wound thereon.

30. The invention as defined in claim 29 wherein said mandrel is also an antenna for said transmitter.

31. The invention as defined in claim 29 wherein said mandrel is at the same electrical potential as said conductor.

32. The invention as defined in claim 28 wherein said plurality of turns are connected as a single continuous loop.

33. The invention as defined in claim 28 wherein said plurality of turns of wire are connected as multiple loops.

34. The invention as defined in claim 29 wherein said mandrel is also a support for said apparatus.

35. In an apparatus for directly measuring at least one parameter adjacent a conductor carrying an alternating current and including a transmitter for continuously transmitting a signal representative of said parameter, the improvement comprising:
   means for directly sensing the parameter adjacent said conductor;
   said sensing means being electrically attached to said transmitter;
   an elongated first hollow housing secured to said conductor, and having two spaced apart ends;
   a second housing positioned between said ends of said first housing and supported thereby; said transmitter positioned in said second housing; and means positioned in said first and second housings and responsive to the alternating current carried by said conductor and receiving an induced current therefrom for powering said transmitter.

36. The invention as defined in claim 35 wherein said sensing means comprises:

a thermocouple probe electrically connected to said transmitter;

said thermocouple probe mounted in a shield.

37. The invention as defined in claim 35 wherein said second housing is positioned away from said conductor to minimize the effect of electric and magnetic fields from said alternating current on said transmitter and on said transmitter powering means.

* * * * *